US009158302B2

(12) United States Patent
Thompson (10) Patent No.: US 9,158,302 B2
(45) Date of Patent: Oct. 13, 2015

(54) SYSTEM AND METHOD FOR DETECTING ELECTRIC POWER PLANT EQUIPMENT OVERHEATING WITH REAL-TIME PLURAL PARALLEL DETECTION AND ANALYSIS PARAMETERS

(75) Inventor: Edward D. Thompson, Casselberry, FL (US)

(73) Assignee: Siemens Energy, Inc., Orlando, FL (US)

( * ) Notice: Subject to any disclaimer, the term of this patent is extended or adjusted under 35 U.S.C. 154(b) by 666 days.

(21) Appl. No.: 13/463,865

(22) Filed: May 4, 2012

(65) Prior Publication Data
US 2013/0297249 A1    Nov. 7, 2013

(51) Int. Cl.
G05B 23/02    (2006.01)
F01K 23/00    (2006.01)

(52) U.S. Cl.
CPC ............ *G05B 23/0235* (2013.01); *F01K 23/00* (2013.01)

(58) Field of Classification Search
CPC .................................................. G01K 17/00
USPC ........................................................ 702/130
See application file for complete search history.

(56) References Cited

U.S. PATENT DOCUMENTS

| 7,293,400 B2 * | 11/2007 | Taware et al. ................. 60/39.27 |
| 2006/0074595 A1 * | 4/2006 | Yuan et al. ..................... 702/182 |
| 2012/0116696 A1 * | 5/2012 | Wank .............................. 702/58 |

FOREIGN PATENT DOCUMENTS

JP    H02183893 A    7/1990

* cited by examiner

*Primary Examiner* — Sujoy Kundu
*Assistant Examiner* — Ricky Ngon (57) ABSTRACT

An overheating detection processing system monitors in real time and stores data samples from the different types of power plant overheating detectors. The system determines a likelihood of whether a stored detector output sample reading, alone or in combination with other readings, is indicative of monitored power plant equipment overheating. The system references previously stored information in an information storage device that associates respective types of detector sample reading levels with equipment overheating. The system also compares a combination of stored sample readings and establishes overheating determination confidence levels. The confidence levels information is combined to derive an overall confidence level of whether the power plant equipment is overheated. An overheating alarm response is initiated if an overheating condition is determined at any confidence level. Additional responses are made based on a combination of calculated confidence levels.

19 Claims, 5 Drawing Sheets

SYSTEM AND METHOD FOR DETECTING ELECTRIC POWER PLANT EQUIPMENT OVERHEATING WITH REAL-TIME PLURAL PARALLEL DETECTION AND ANALYSIS PARAMETERS

BACKGROUND OF THE DISCLOSURE

1. Field of the Invention

The present invention relates to power plant equipment overheating and fire detection methods and systems. Exemplary power plant equipment includes generators, steam or gas turbines and power distribution and control apparatus including circuit protection, energy storage capacitor banks, power conditioning equipment, and the like. More particularly, the present invention utilizes plural types of equipment overheating monitoring detectors, such as smoke detectors and temperature detectors, that are sampled in parallel in real time. The system determines in real time a likelihood of whether any of the types of detector samples, alone or in combination with other types of detector samples, is indicative of monitored equipment overheating. An exemplary determination is made by referencing previously stored information that associates respective types of detector sample reading levels, or combinations of respective types of detector sample reading levels, with equipment overheating, and establishing an overall overheating determination confidence level. If the overall overheating determination confidence level exceeds certain levels, then different actions can be implemented based on the confidence level. For instance, a confidence level of 1% might result in an operator information only warning. A confidence level of 40% might result in a high priority warning accompanied by beeper, text, annunciation or automatic email alerting. A confidence of 80% might result in alarms and automatic fire control activation.

2. Description of the Prior Art

Existing power plant equipment overheating and fire detection systems often utilize a single type of detector technology that tends to be more effective at detecting a specialized group of events than a broad spectrum of all potential events. In view of this operational challenge, any particular type of detector may be relatively ineffective for some types of events if it has a tendency to issue false alarms where there is no actual overheating or fire condition. For example, optical smoke detectors detect smoke that is visible within the detector's emission light frequency. Smoke that is not visible within the detector's frequency spectrum alarm will not be detected. Conversely atmospheric water vapor in high humidity environments may trigger false alarms.

Another detector system operational challenge is binary operation or alarming: for example, the detector only alarms under one condition and is otherwise silent; the detector activates a sprinkler system or otherwise does not; the detector has a single output reading (e.g., "alarm" or silent). Thus, conventional detector systems rely on human intuitive judgment to determine whether a true overheating incident is occurring or whether it is merely a false alarm. A rigid, rules base detection system relying on a single digital alarm/no alarm information input is very impractical unless the triggering event is sufficiently grave to warrant conservative automatic alarm decision making and subsequent action. For example, a sprinkler system fire detector may require detected temperature to be sufficiently high to allow power plant equipment to be damaged by overheating rather than risk shutting down the plant or spraying water on equipment. In the case of a halide fire suppression system one would not want automatic suppression triggering if human operators are present in the suppression volume.

A human-monitored power plant overheating detection system allows an experienced operator to evaluate a detector alarm in the context of historical plant operation and other available information so that an ultimate conclusion of whether an overheating or fire condition is likely to exist is based at least on an intuitive probability analysis of plural information sources. For example, based on past operational history it may be known that a specific generator emits smoke under certain load conditions that is not considered harmful to the power plant. In another exemplary scenario, welding or other repair activities may generate smoke that is sensed by a smoke detector, but the operator knows that the smoke is not attributed to the monitored generator operation.

Thus, a need exists in the art for a power plant overheating detection system that can in real time monitor plural types of detector inputs, evaluate whether the inputs separately or in combination are indicative of an overheating condition by referencing stored information resources, and, as is performed by a human operator, make an overall confidence level determination of whether the monitored power plant equipment is experiencing an overheating condition.

SUMMARY OF THE INVENTION

Accordingly, an object of the invention is to create a real time operational, automatic overheating detection system for a power plant that can monitor plural types of detector inputs, evaluate whether the inputs separately or in combination are indicative of an overheating condition by referencing stored information resources, and make, without human intervention, an overall confidence level determination of whether the monitored power plant equipment is experiencing an overheating condition.

These and other objects are achieved in accordance with the present invention by a system and method for detecting power plant equipment overheating that actively monitors different types of overheating detectors, such as smoke detectors and temperature detectors. The system stores data samples from the different types of power plant overheating detectors. The system determines a likelihood of whether a stored detector output sample reading, alone or in combination with other readings, is indicative of monitored power plant equipment overheating by performing the following tasks in any order. The system references previously stored information (from other sites and the site of the referenced system) in an information storage device that associates respective types of detector sample reading levels with equipment overheating, and establishes a first overheating determination confidence levels. The system also compares a combination of stored sample readings and establishes a second overheating determination confidence level. The system may establish multiple confidence levels based on sensor type and location, number of sensors available, and the use of different evaluation methods, and history data. The system also combines the plurality of confidence level determinations to derive an overall confidence level of whether the power plant equipment is overheated. This overall determination is made using a variety of techniques, such as fuzzy logic, neural network evaluation, case-based reasoning, or other methodology. Different overheating alarm responses are initiated if an overheating condition is determined based on the system's evaluated confidence level.

More particularly, in some embodiments of the present invention the overheating detection processing system monitors in real time and stores samples from the different types of overheating detectors. The system in real time determines a likelihood of whether a combination of the stored types of detector output sample readings (which may be sampled in different time periods) is indicative of monitored power plant equipment overheating by performing the following tasks in any order. The system references previously stored information in an information storage device that associates respective types of detector sample reading levels with equipment overheating. For example, rule-based stored information that detected temperature above a threshold value is indicative of overheating. The system also compares at least one stored sample reading from each respective type of overheating detector with respective stored association information relevant thereto to determine respective first overheating determination confidence levels. For example, a specific temperature reading level or higher is likely to be caused by overheating, or a specific smoke particulate level is likely to be caused by overheating. The system also compares a combination of the at least one stored sample reading from each respective type of overheating detector with respective stored association information relevant to the combination, if such combination information is available, and establishes a second overheating determination confidence level. For an example of a second confidence level determination, a detector temperature reading is a possible indication of overheating according to the referenced previously stored information, but lack of detected smoke readings from a smoke detector sample is a low indication of an overheating condition. The combination of both the temperature and smoke readings referenced in the previously stored information enables the system to determine as a second confidence level that there is an overall low likelihood of overheating. Additional confidence levels may also be calculated based on the numbers and types of sensors. The system also combines all desired confidence levels information to derive an overall confidence level of whether the power plant equipment is overheated. Here in the example the system concludes by the combination of multiple confidence levels that there is a low likelihood of an overheating incident. Hence no alarm is enunciated and a false alarm is averted. The system may enunciate an alarm recommendation upon determination of any confidence level. For example an alarm condition may be enunciated at a first confidence level, if an individual temperature reading from a temperature detector exceeds a predefined set point threshold.

Additionally, the present invention features system and method for detecting power plant equipment overheating that monitors in real time actively monitors different types of overheating detectors that for example are suitable for detecting different types of overheating conditions and/or are complementary in detecting overheating conditions. An overheating detection processing system samples in real time the plurality of types of overheating detector output samples and stores those readings. The system in real time determines a likelihood of whether a single or combination of the stored types of detector output sample readings is indicative of monitored power plant equipment overheating by performing the following steps in any order. The system references previously stored information in an information storage device that associates respective types of detector sample reading levels with equipment overheating. The system compares at least one stored sample reading from each respective type of overheating detector with respective stored association information relevant thereto to determine respective first overheating determination confidence levels. The system also compares a combination of the at least one stored sample reading from each respective type of overheating detector with respective stored association information relevant thereto, if such combination information is available, to determine a second overheating determination confidence level. Additional confidence levels may be determined using additional sensors and techniques. The system combines all desired confidence levels information to derive an overall confidence level of whether the power plant equipment is overheated.

The objects and features of the present invention may be applied jointly or severally in any combination or sub-combination by those skilled in the art.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of the present invention can be readily utilized in an overheating detection processing system that monitors in real time and stores samples from the different types of power plant overheating detectors. The system determines a likelihood of whether a stored detector output sample reading, alone or in combination with other readings, is indicative of monitored power plant equipment overheating by performing the following tasks in any order. The system references previously stored information in an information storage device that associates respective types of detector sample reading levels with equipment overheating, and establishes a first overheating determination confidence level. The system also compares a combination of stored sample readings and establishes a second overheating determination confidence level. The system also combines multiple confidence levels information to derive an overall confidence level of whether the power plant equipment is overheated. An overheating alarm response is initiated if an overheating condition is determined at any confidence level. By utilizing plural types of overheating detector readings and making multiple confidence level decisions whether an overheating condition exists, the system reduces likelihood of false alarms and reinforcing the overall determination of whether or not an alarm response is correct. The system can update the knowledge base of stored information and thus become "self-learning" to improve its confidence level determinations. Human input from the power plant and other personnel may be included in this or any other update. The system includes the ability for human operators to input information about accuracy of the system's outputted confidences, as well as their experiential and judgmental knowledge. The base of stored information updates can be shared with other overheating detections systems in other power plants and/or in a central monitoring station that is responsible for multiple power plants.

Detection System Hardware Description

Figure 1:
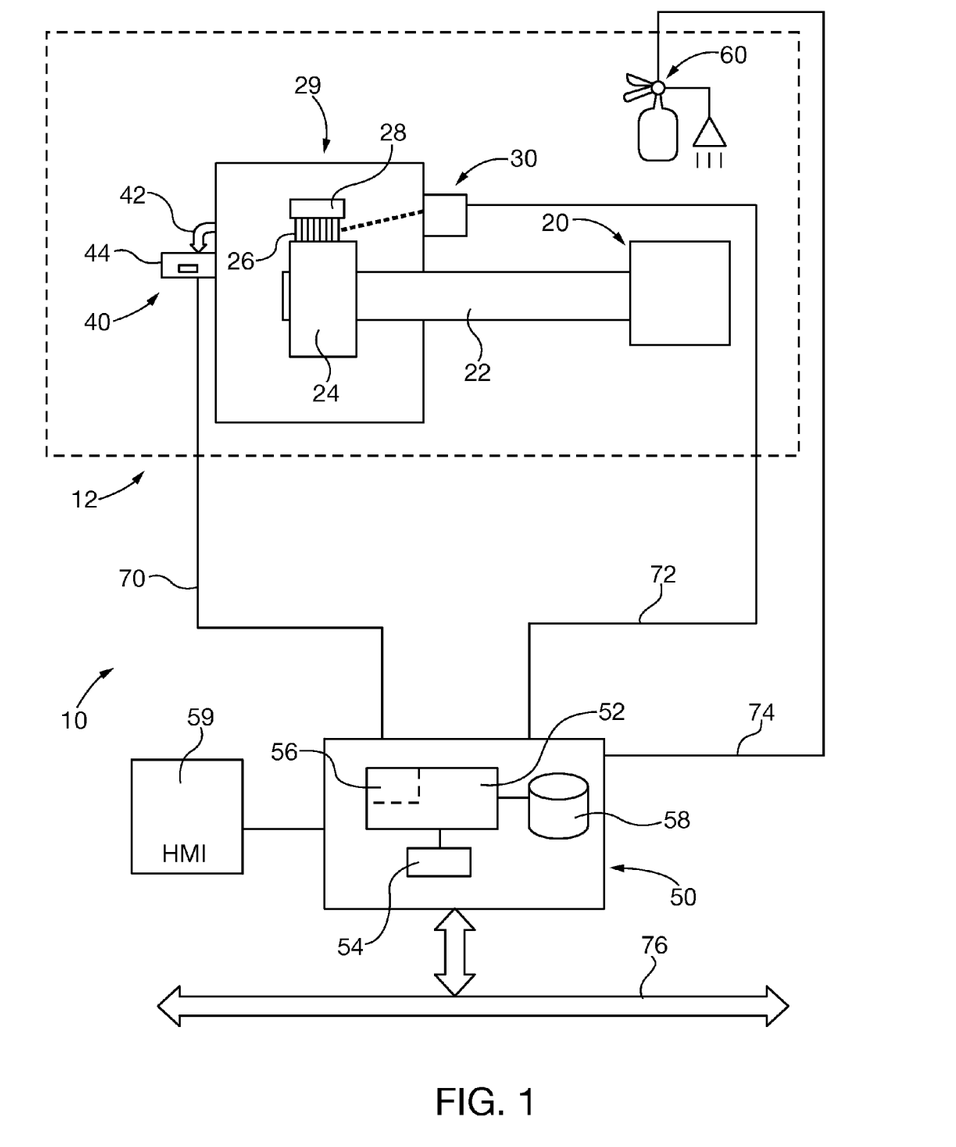
FIG. 1 is a schematic diagram of an embodiment of an electric power plant overheating detection system.

An embodiment of the system of the present invention is shown in FIG. 1. The overheating detection system 10 monitors power plant 12, including a known construction generator 20. The generator 20 has a shaft 22 and collection ring 24. Carbon brushes 26 contact the collection ring 24 in order to transfer electric power current to an electrically conductive winding that is mounted on the shaft 22. Brush rigging assembly 28 retains the brushes 26 in defined orientation relative to, and causes them to exert a biasing force on the collection ring 24 and shaft 22—all of which are enveloped in collector housing 29.

The system utilizes plural types of overheating detectors. A first type of overheating detector is an infrared temperature scanner (ITS) 30 or other non-contacting type temperature measuring device that utilizes an infrared beam to detect and measure the temperature of one or more of the carbon bushes 24. The ITS 30 is mounted and oriented on the collector housing 29 so that it has a direct as possible line of sight to the brushes 26. The ITS 30 generates a temperature detector sample signal output. A second type of overheating detector mounted on the collector housing 29 is a generator condition monitor (GCM) 40 that includes a smoke detector module. The GCM 40 includes an air sampling line 42 that is in communication with the collector housing 29 interior that collects air flow from the brush rigging assembly and channels the air sample through an ion chamber 44. The ion chamber 44 in conjunction with known GCM 40 sample acquisition electronics generates a smoke detector sample signal output.

The system further includes an overheating analyzer controller 50 that has a processor 52, memory 54 coupled to the processor and software modules 56 that when executed by the processor causes the system to monitor the detectors 30, 40 and determine the likelihood of whether detector sample values alone or in combination are indicative of a generator 20 overheating condition in the power plant 10, using the steps subsequently described herein. The controller 50 may be included in a dedicated design hardware platform, such as a fire detection system or a personal computer utilizing a known operating system. The controller 50 and its processor 52 have access to a data storage device 58, which may include a disc drive, non-volatile solid state memory, firmware or the like. The storage device 58 may be incorporated into the analyzer controller 50 or be coupled to and remotely accessible to the controller. Data storage device 58 includes previously stored information that associates respective types of detector sample readings with equipment overheating, and may include by way of non-limiting example rules, set points, absolute reading limits, historical information, weightings and statistical probabilities. A human machine interface (HMI) 59 is coupled to the controller 50, and may include a visual display, keyboard, mouse or other known HMI devices. The HMI may be used to configure or monitor the detection system 10, modify the stored information in the system and allow human operator interaction and control over the system.

In response to an alarm condition the system 10 may automatically operate or enunciate for human operation output devices, such as halide fire suppression system 60. The controller 50 is respectively in communication with the smoke detector 40, the temperature detector 30 and the fire suppression system 60 by respective communications pathways 70, 72 and 74, which may include by way of non-limiting example wireless signal, known metallic cable including twisted pair wiring, co-axial, multiple conductor wire cable, optical cable and data busses employing known communications protocols. Additionally the controller 50 may be in communication with a data bus 76 for communication with other devices within or remote from the power plant 12.

Figure 2:
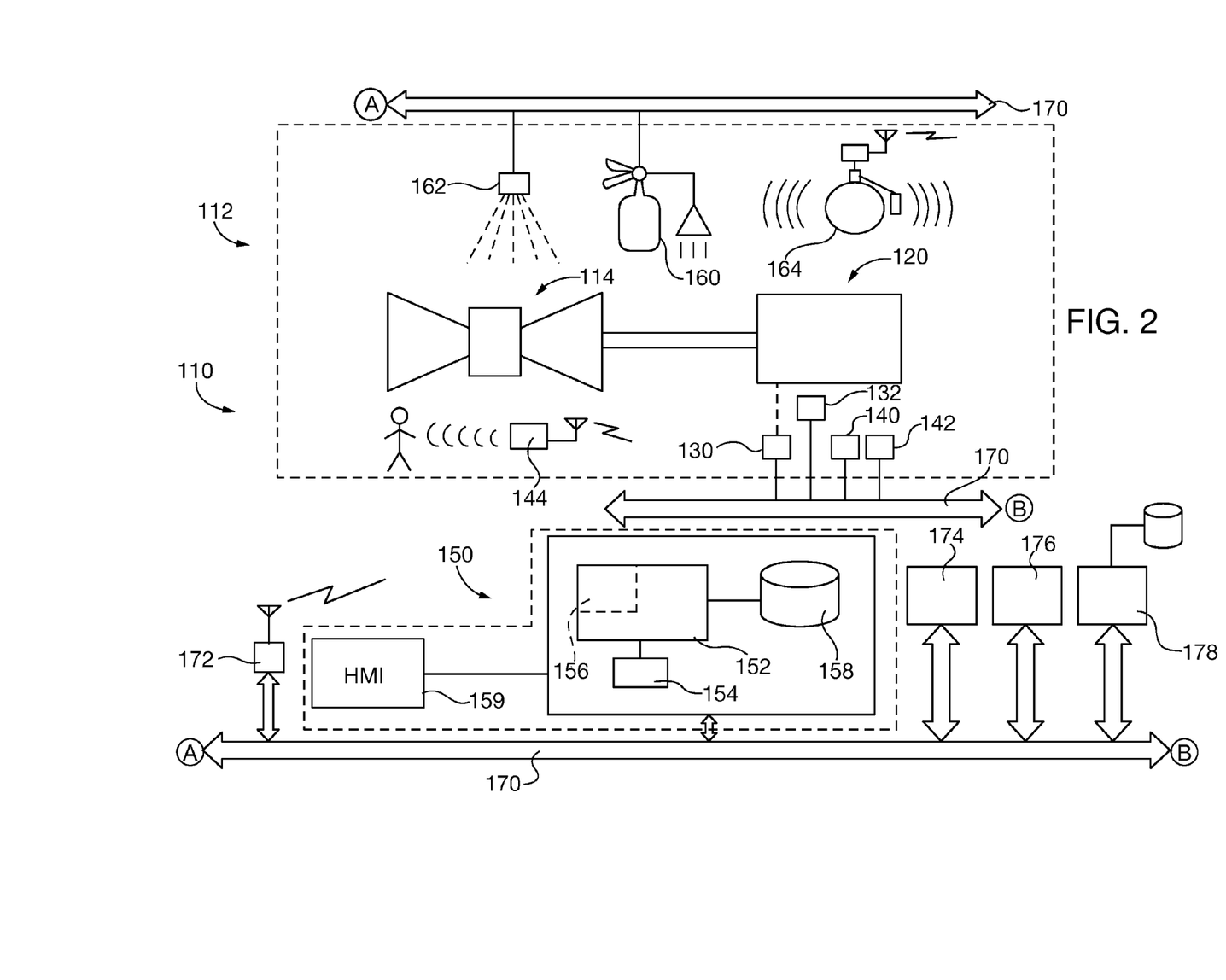
FIG. 2 is a schematic diagram of another embodiment of an electric power plant overheating detection system.

Another embodiment of the detection system 110 of the present invention is shown in FIG. 2. Power plant 112 includes gas turbine 114 and generator 120 and a plurality of different types of overheating detectors, including first- and second-type temperature detectors 130, 132 first- and second-type smoke detectors 140, 142 and wireless motion detector 144 for detection of human personnel within the plant. One or a plurality of each type of detector may be distributed about the power plant 112 in order to monitor various types of power plant equipment. The various overheating detectors may be adapted for specialized detection of different types of overheating conditions.

The system 110 has overheating analysis controller 150 whose functions and general structure are similar to those of controller 50 of the embodiment of FIG. 1, including processor 152 coupled to memory 154 and executing software instruction modules 156. The controller 150 is coupled to and accesses data storage device 158 that includes pre-stored information that associates detector sample reading with overheating conditions, and HMI 159. The controller 150 is capable of enunciating overheating conditions based on analysis of detectors 130, 132, 140, 142 sample readings, and directly or indirectly operating output devices such as halide fire suppression system 160, sprinkler system 162, or wireless audio/strobe alarm 164.

A communications pathway, such as data bus 170 facilitates communications between the controller 150 and the respective detectors 130, 132, 140, 142, 144 or the respective output devices 160, 162, 164. As previously described other types of metallic or fiber optic cables and wireless transmitters/receivers may be utilized to provide communications pathways between devices. The controller 150 is capable of communicating with other devices on, the data bus, including by way of non-limiting example wireless receiver/transmitters 172, facility fire detection and control systems 174 remote monitoring stations 176 and remote data storage/web hosting/data access sites 178.

To facilitate a clear understanding of the present invention, illustrative examples have been provided herein which described certain aspects of the invention. However, it is to be appreciated that these illustrations are not meant to limit the scope of the invention, and are provided herein to illustrate certain concepts associated with the invention. It is also to be understood that the present invention may be implemented in various forms of hardware, software, firmware, special purpose processors, or a combination thereof.

Detection System Operation

As previously noted the system monitors in real time and stores samples from the different types of power plant overheating detectors. The system determines a likelihood of whether a stored detector output sample reading, alone or in combination with other readings, is indicative of monitored power plant equipment overheating by performing the following tasks in any order. The system references previously stored information in an information storage device that associates respective types of detector sample reading levels with equipment overheating, and establishes first overheating determination confidence levels. The system also compares a combination of stored sample readings and establishes a second overheating determination confidence level, and potentially additional overheating confidence levels. The system also combines all desired confidence levels information to derive an overall confidence level of whether the power plant equipment is overheated. An overheating alarm response is initiated if an overheating condition is determined at any confidence level.

Preferably, the present invention is implemented in software as a program or plural program modules tangibly embodied on a program storage device. The program may be uploaded to, and executed by, a machine comprising any suitable architecture. As previously described herein, preferably the controller 50, 150 is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the program (or combination thereof) is executed via the operating system. In addition, various other peripheral devices may be connected to the computer platform such as an additional data storage device 58, 158, 178 and a various output devices.

Figures 3, 3A:
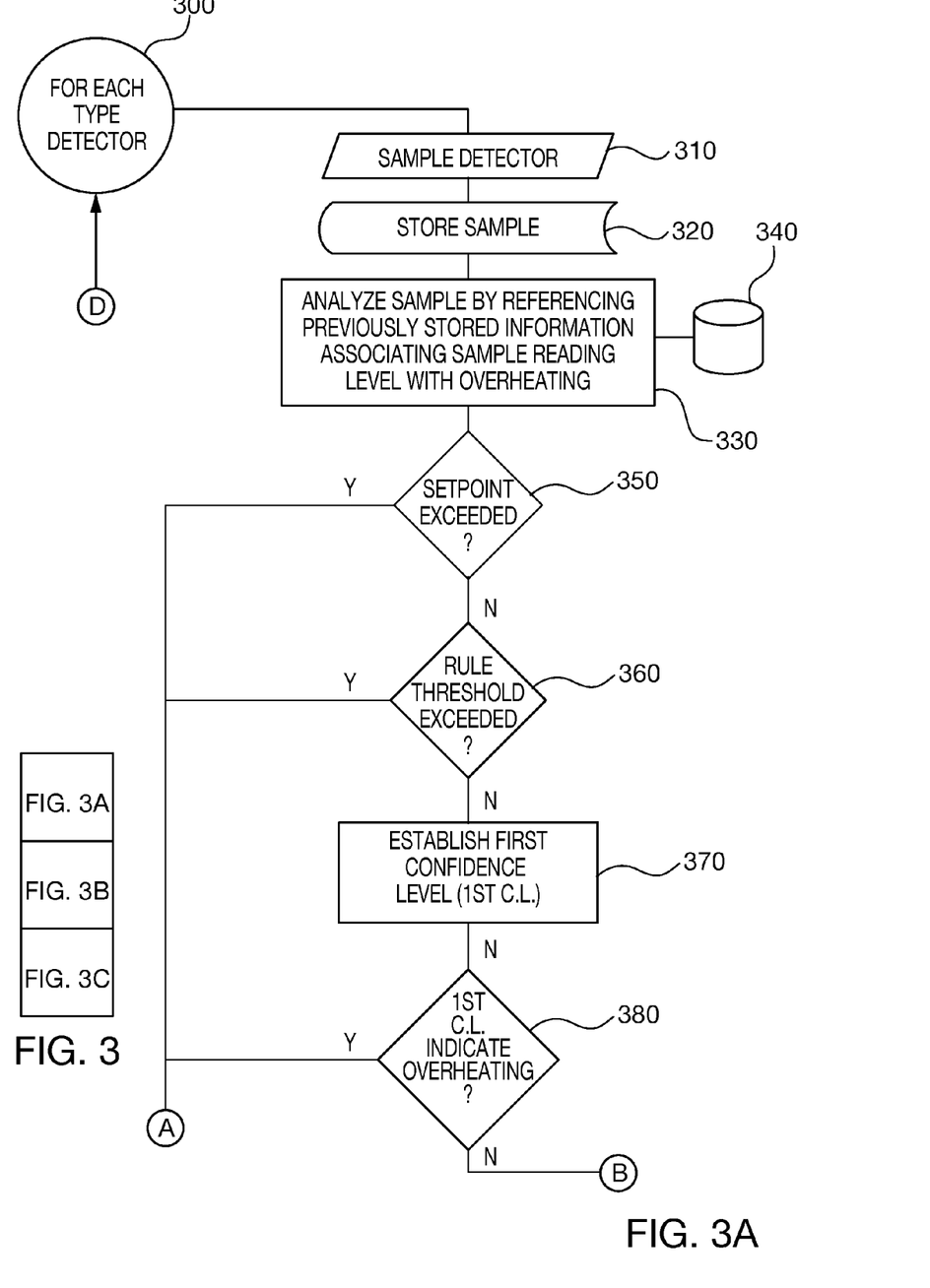
FIG. 3 is a flowchart schematic diagram of an embodiment of a method for detecting electric power plant overheating using the system of FIG. 1 or 2.
Figure 3B:
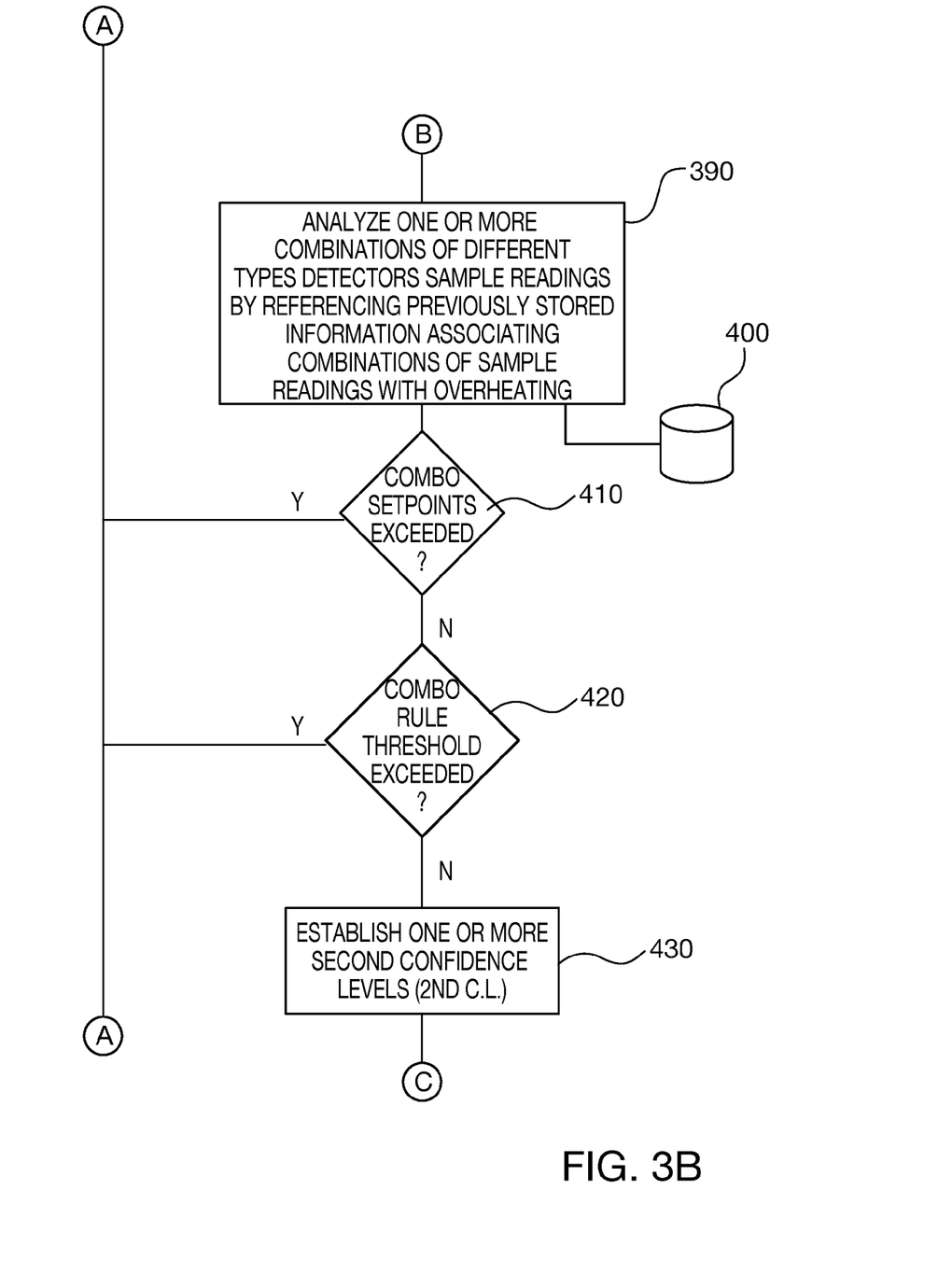
Figure 3C:
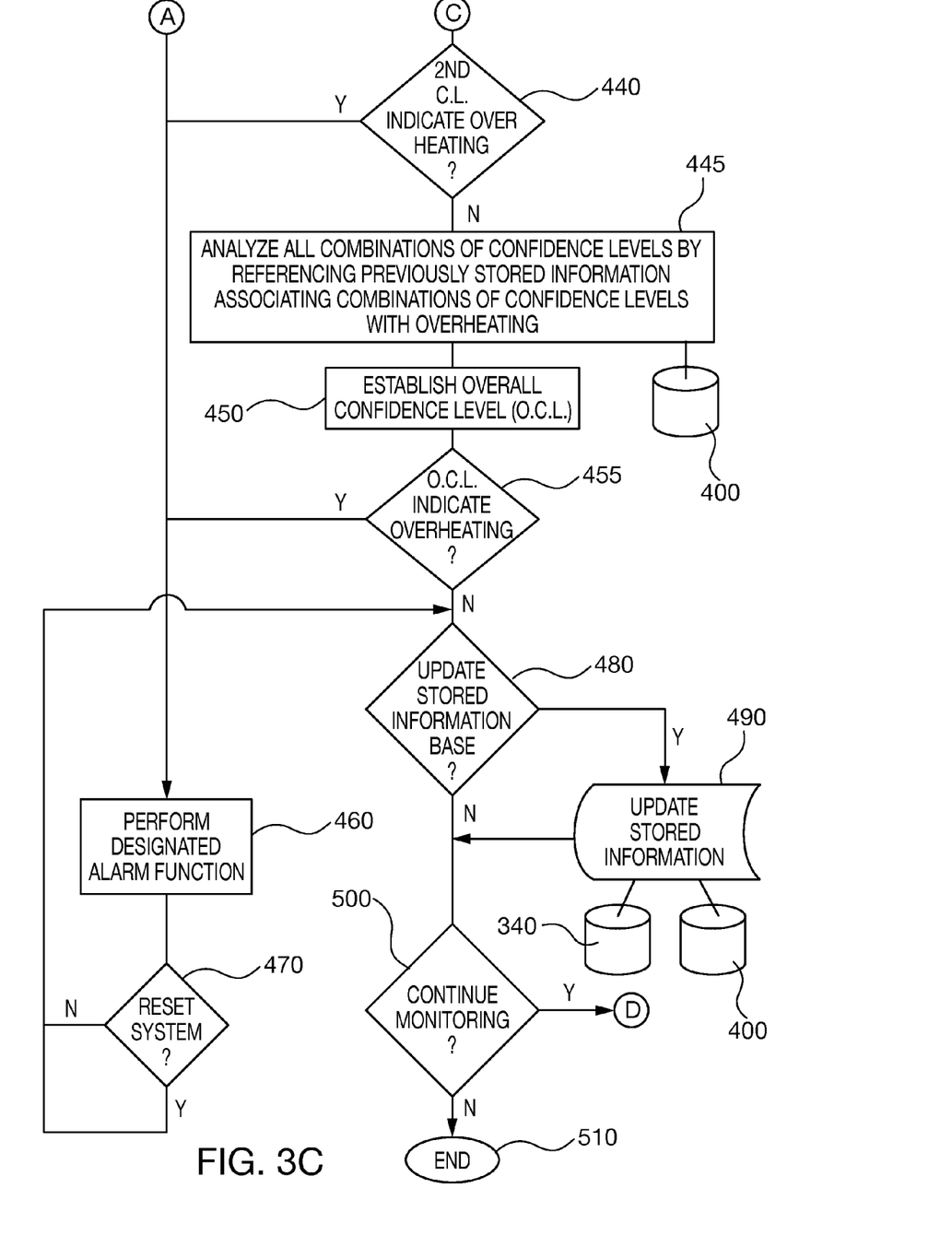

FIG. 3 is a flowchart of controller 50 or 150 operation of their respective software module 56, 156 instruction sets. Steps 300-380 are optionally performed for each individual type of overheating detector 30, 40, 130, 132, 140, 142 that is desired to be monitored. Assuming that it is desired to monitor each individual type of overheating detector 30, 40, 130, 132, 140, 142 when practicing the present invention then Steps 330-380 are performed. If there is a plurality of any type of detector, all the steps 300-380 are performed for all of them that are desired to be monitored. The steps 300-380 may be performed in parallel or sequentially for each detector, or in any combination or sub-combination desired for a monitoring function. Alternatively, if it is desired to practice the present invention by analyzing only combinations of types of detectors, steps 310 and 320 are practiced and then steps 330-380 are skipped. For the sake of brevity operation and monitoring of an individual ITS-type temperature detector 30 will be described in greater detail, it being understood that the monitoring steps and concepts will be similar for other types of detectors.

In step 300 the ITS detector 30 is selected for further monitoring steps by the system 50. A detector sample is taken at step 310 and stored in step 320. In step 330 the system references in the data storage device 340 previously stored information about ITS detector 30 sample readings and their associations with overheating conditions of the generator brushes 26. The stored information may include by way of non-limiting example rules, set points, absolute reading limits, historical information, including human experiential and judgmental or other input concerning, for example, detector accuracy or accuracy of predictions made by the system, weightings and statistical probabilities for generator brush operating temperatures and overheating conditions for this specific generator 20 or other generators in the same or different geographically located power plants. The data storage device 340 may be the data storage device 58 in the embodiment of FIG. 1 or the data storage devices 158 or 178 of the embodiment of FIG. 2.

In step 350 the system 50 determines whether the ITS detector 30 temperature reading exceeds a designated set point or absolute temperature reading that is indicative of an overheating condition. If the actual reading exceeds the set point reading the system will enunciate an overheating alarm condition at step 460. If not, the system will determine whether the actual reading is indicative of a rule-based overheating threshold (e.g., if defined temperature exceeded for over 30 minutes enunciate overheating condition), and enunciate an overheating alarm condition at step 460. If not, the system next makes a first confidence level ($1^{st}$ C.L.) determination of the likelihood that the sample reading stored in step 320 is indicative of an overheating condition based on stored information in the data storage device 340. Again, at step 380, if the first confidence level determined in step 370 is indicative of an overheating condition an overheating alarm condition will be enunciated at step 460.

Confidence level determination is performed by the system 10 without human intervention using any one of fuzzy logic, self-learning, algorithmic, statistical or heuristic methods in the controller 50. For example, based on self-learning the system 10 may associate a given combination of smoke and temperature detection readings with a previously experienced non-overheating operating condition in a particular monitored generator, yet at a later time may enunciate an overheating condition if the operating condition exceeds a defined number of minutes. In another example, by employing a known fuzzy logic program module in the controller 50, the system may weigh a combination of readings in plural types of detectors as indicative of an impending overheating condition though no individual reading alone is considered indicative of an overheating condition.

If the first confidence level does not indicate an overheating condition at step 380, combinations of different types of detector sample readings and/or sample reading taken at different times are analyzed at step 390 by referencing previously stored information in data storage device 400 that associates combinations of sample readings with overheating conditions. The previously stored information in data storage device 400 is of the same types and sources that were generally described with respect to storage device 340. The function of data storage device 400 may be provided by data storage devices 58, 158 and/or 178. The stored information in storage device 400 may include by way of non-limiting example rules, set points, absolute reading limits, historical information, weightings and statistical probabilities for generator brush operating temperatures and overheating conditions for this specific generator 20 or other generators in the same or different geographically located power plants, other types of temperature detectors, and one or more types of smoke detectors 40, as well as human-inputted information.

In step 410 the system 50 determines whether any combination of set points or absolute reading limits are exceeded, and if so enunciates an alarm condition at step 460. For example if there is a combination of a temperature detector reading exceeding a defined threshold and a smoke detector reading exceeding a defined threshold, even though either reading, in isolation, would not necessarily be indicative of an overheating event. Individual confidence levels for step 410 are also evaluated based on a continuous basis as well as comparison to thresholds. For example, the confidence of an individual temperature detector alarm of 20% is different that 80%. Likewise a confidence of −20% is different from −80%. A confidence of −5% may or may not be much different from +5% depending on the sensor, location, data history, or other parameters which will be taken into account in the final confidence evaluation.

In step 420, the system 50 determines whether a rule relating to a combination of types of detector readings has been exceeded, and if so enunciates an alarm condition at step 460. For example, if a sampled temperature gradient exceeds a certain value within five minutes in combination with a smoke detector reading exceeding a defined value.

If no rule-based analysis in step 420 identifies an overheating condition, the system evaluates one or more detector combination readings next-makes a second confidence level (2nd C.L.) determination of the likelihood that a combination of sample reading stored in respective steps 320 is indicative of an overheating condition based on stored information in the data storage device 400. Again, at step 440, if the second confidence level determined in step 430 is indicative of an overheating condition an overheating alarm condition will be enunciated at step 460, as was done with the 1$^{st}$ C.L. determinations in step 380.

If no 2nd C.L. overheating condition was indicated at step 440 the system analyzes combinations of all desired confidence levels (1st or 2nd C.L.s) in step 445 by referencing previously stored information in the base of stored knowledge 400 that associates combinations of confidence levels with overheating conditions. The base of stored knowledge includes the types of information previously described, including probabilities or likelihoods of overheating. At step 450 the system determines an overall confidence level (O.C.L.) based on the analysis of all desired confidence levels. If the O.C.L. determined at step 450 is indicative of an overheating condition an alarm condition will be enunciated at step 455, as was done previously at steps 380 and 440.

If at any time a decision is made to enunciate an alarm condition, the designated alarm function is performed at step 460, and may include outputting overheating status information to other systems, such as a facility fire detection and control system 174 that pursuant to fire codes may be responsible for alerting a local fire department, operating sprinklers 162, etc., and/or a remote monitoring station 176. Other detector information gathered by the respective systems 10, 110 may intentionally cause a delay in implementing an overheating response. For example if motion detector 144 senses presence of human personnel, the system 110 may block deployment of a halide fire suppression system 160 or a sprinkler 162 until personnel are evacuated from the affected area of the plant 112.

After enunciation of overheating at step 460, a determination whether to reset the detection system is made at step 470. Whether the system 50 is reset at step 470 or whether there was no O.C.L. determination of an overheating condition at step 455 a decision is made at step 480 whether to update the stored information base with information gathered during prior monitoring cycles. Updated information is stored in the data storage devices 340, 400 in step 490. Thereafter the system 50, 110 determines whether to continue monitoring at step 500, or to end monitoring at step 510.

Although various embodiments which incorporate the teachings of the present invention have been shown and described in detail herein, those skilled in the art can readily devise many other varied embodiments that still incorporate these teachings.

It is to be understood that, because some of the constituent system components and method steps depicted in the accompanying figures are preferably implemented in software, the actual connections between the system components (or the process steps) may differ depending upon the manner in which the present invention is programmed. Specifically, any of the computers or devices may be interconnected using any existing or later-discovered networking technology and may also all be connected through a larger network system, such as a corporate network, metropolitan network or a global network, such as the Internet.

What is claimed is:

1. A method for detecting a power plant equipment overheating or fire event, comprising:
    placing in a power plant pluralities of first and second types of overheating detectors, for respectively monitoring first and second different ambient physical parameters that are indicative of power plant equipment overheating or fire;
    providing an overheating detection processing system, coupled to the pluralities of first and second types of detectors, for receiving output sample readings from all of the detectors, and coupled to at least one information storage device;
    causing the processing system to:
    sample remotely in real time all of the detectors that are actively monitoring power plant equipment;
    store in the information storage device at least one output sample reading from each detector;
    determine in real time a likelihood of whether a combination of stored sample reading levels from both of the first and second detector types identifies an ambient physical parameter combination of a power plant equipment overheating or fire event, by performing the following in any order:
        referencing previously stored association information in the information storage device that associates respective separate types of detector sample temporal reading levels and trends, or combinations of types thereof, with previously known equipment overheating or fire temporal reading level trends of ambient physical parameters;
        separately comparing at least one stored sample reading level from at least one detector of each respective type of overheating detector with respective stored association information relevant thereto that includes historical trend information, to determine respective separate first overheating confidence levels, for each type of detector, that the power plant is actually experiencing an equipment overheating or fire event;
        comparing a combination of the at least one stored sample reading from both types of overheating detectors with respective stored association information relevant thereto that includes historical trend information, if such combination stored information is available, to determine at least one second overheating confidence level that the power plant is actually experiencing an equipment overheating or fire event; and
        combining all previously determined confidence levels information to derive an overall confidence level of whether the power plant equipment is experiencing an actual overheating or fire event.

2. The method of claim 1, further comprising updating previously stored association information, for either type of detector or combination thereof with additional association information derived from performing additional determinations.

3. The method of claim 2, further comprising the processing system outputting overheating or fire event status information.

4. The method of claim 2, further comprising the processing system operating overheating or fire protection apparatus in response to a determination that the power plant equipment is overheating.

5. The method of claim 2, wherein the previously stored event association information comprises any one of rules, set points, absolute reading limits, historical information, weightings, human inputs and statistical probabilities.

6. The method of claim 2, wherein the confidence level determinations are performed using any one of fuzzy logic, self-learning, algorithmic, statistical, neural network logic, case-based reasoning or heuristic methods.

7. The method of claim 1, further comprising the processing system outputting overheating or fire status information.

8. The method of claim 1, further comprising the processing system operating overheating or fire protection apparatus in response to a determination that the power plant equipment is overheating or on fire.

9. The method of claim 1, wherein the previously stored event association information comprises any one of rules, set points, absolute reading limits, historical information, weightings, human inputs and statistical probabilities.

10. The method of claim 1, wherein the confidence level determinations are performed using any one of fuzzy logic, self-learning, algorithmic, statistical, neural network logic, case-based reasoning or heuristic methods.

11. A system for detecting a power plant equipment overheating or fire event, comprising:
pluralities of first and second types of overheating detectors that are remotely actively monitoring and sampling in real time, respectively, first and second different ambient physical parameters that are indicative of power plant equipment overheating or fire;
an overheating detection processing system, coupled to the pluralities of types of first and second detectors, for receiving output sample readings for all of the detectors, and at least one information storage device, the processing system including a processor capable of executing instructions stored in an accessible memory device, that when executed thereby cause the processing system to:
sample remotely in real time all of the detectors that are actively monitoring power plant equipment;
store in the information storage device at least one output sample reading from each detector;
determine in real time a likelihood of whether a combination of stored sample reading levels from both of the first and second detector types identifies an ambient physical parameter combination of a power plant equipment overheating or fire event by performing the following in any order:
referencing previously stored association information in the information storage device that associates respective separate types of detector sample temporal reading levels and trends, or combinations of types thereof with previously known equipment overheating or fire temporal reading level trends of the ambient physical parameters;
separately comparing at least one stored sample reading level from at least one detector of each respective type of overheating detector with respective stored association information relevant thereto that includes historical trend information, to determine respective separate first overheating confidence levels, for each type of detector, that the power plant is actually experiencing an equipment overheating or fire event;
comparing a combination of the at least one stored sample reading from both types of overheating detectors with respective stored association information relevant thereto that includes historical trend information, if such combination stored information is available, to determine a at least one second overheating confidence level that the power plant is actually experiencing an equipment overheating or fire event; and
combining all previously determined confidence levels information to derive an overall confidence level of whether the power plant equipment is experiencing an actual overheating or fire event.

12. The system of claim 11, further comprising a power plant equipment overheating status output device in communication with both the overheating detection processing system and apparatus, selected from the group consisting of human machine interfaces, remotely coupled electronic information processing and communication systems, audio alarms, visual alarms, circuit protection devices, fire protections systems, environmental control systems, public address systems, fire suppression systems, and power distribution and control systems including power circuit protection systems.

13. The system of claim 11, wherein the previously stored detector sample reading and overheating or fire event association information, for either type of detector or combination thereof in the information storage device is updated periodically with additional new association information resulting from performing additional determinations.

14. The system of claim 11, wherein the previously stored event association information comprises any one of rules, set points, absolute reading limits, historical information, weightings, human inputs and statistical probabilities.

15. The system of claim 11, wherein the processing system performs the confidence level determinations using any one of fuzzy logic, self-learning, algorithmic, statistical, neural network logic, case-based reasoning or heuristic methods.

16. A system for detecting a power plant equipment overheating or fire event, comprising:
of pluralities of first and second types of overheating detectors that are remotely actively monitoring and sampling in real time, respectively, first and second different ambient physical parameters that are indicative of power plant equipment overheating or fire;
an overheating detection processing system, coupled to the pluralities of types of first and second detectors, for receiving output sample readings for all of the detectors, and at least one electronic information storage device, the processing system including:
means for sampling remotely in real time all of the detectors that are actively monitoring power plant equipment;
means for storing in the information storage device at least one output sample reading from each detector;
means for determining in real time a likelihood of whether a combination of stored sample reading levels from both of the first and second detector types identifies an ambient physical parameter combination of a power plant equipment overheating or fire event, including:
means for referencing previously stored association information in the information storage device that associates respective separate types of detector sample temporal reading levels and trends, or combinations of types thereof with previously known equipment overheating or fire temporal reading level trends of ambient physical parameters;
means for comparing a combination of the at least one stored sample reading from both types of overheating detectors with respective stored association information relevant thereto that includes historical trend information, to determine a combined overheating confidence level that the power plant is actually experiencing an equipment overheating or fire event; and
means for combining all previously determined confidence levels information to derive an overall confidence level of whether the power plant equipment is experiencing an actual overheating or fire event.

17. The system of claim 16, further comprising a power plant equipment overheating or fire status output device in communication with both the overheating detection processing system and apparatus, selected from the group consisting of human machine interfaces, remotely coupled electronic information processing and communication systems, audio alarms, visual alarms, circuit protection devices, fire protections systems, environmental control systems, public address systems, fire suppression systems, and power distribution and control systems including power circuit protection systems.

18. The system of claim 16, wherein:
- the previously stored event association information in the information storage device comprises any one of rules, set points, absolute reading limits, historical information, weightings, human inputs and statistical probabilities;
- the previously stored detector sample reading and overheating or fire event association information, for either type of detector or combination thereof, is updated periodically with additional new association information from the means for determining; and
- the means for determining includes any one of fuzzy logic, self-learning, algorithmic, statistical, neural network logic, case-based reasoning or heuristic methods.

19. The system of claim 16, the means for determining further comprising:
- means for separately comparing at least one stored sample reading level from at least one detector of each respective type of overheating detector with respective stored association information relevant thereto that includes historical trend information, to determine respective separate first overheating confidence levels, for each type of detector, that the power plant is actually experiencing an equipment overheating or fire event; and
- means for comparing a combination of the at least one stored sample reading from both types of overheating detectors with respective stored association information relevant thereto that includes historical trend information, if such combination stored information is available, to determine a at least one second overheating confidence level that the power plant is actually experiencing an equipment overheating or fire event;
- wherein the means for combining confidence levels determination information combines all previously determined first and second confidence levels information to derive an overall confidence level of whether the power plant equipment is experiencing an actual overheating or fire event.

\* \* \* \* \*